United States Patent
Serrano

(10) Patent No.: US 10,793,739 B2
(45) Date of Patent: Oct. 6, 2020

(54) HOLLOW POLYMER COMPOSITION

(71) Applicant: Rohm and Haas Company, Collegeville, PA (US)

(72) Inventor: Carmen Serrano, Seillans (FR)

(73) Assignee: Rohm and Haas Company, Collegeville, PA (US)

( * ) Notice: Subject to any disclaimer, the term of this patent is extended or adjusted under 35 U.S.C. 154(b) by 54 days.

(21) Appl. No.: 15/766,405

(22) PCT Filed: Oct. 6, 2016

(86) PCT No.: PCT/US2016/055624
§ 371 (c)(1),
(2) Date: Apr. 6, 2018

(87) PCT Pub. No.: WO2017/062538
PCT Pub. Date: Apr. 13, 2017

(65) Prior Publication Data
US 2018/0355203 A1     Dec. 13, 2018

Related U.S. Application Data

(60) Provisional application No. 62/239,362, filed on Oct. 9, 2015.

(51) Int. Cl.
| | | |
|---|---|---|
| C09D 125/10 | (2006.01) | |
| C09D 5/02 | (2006.01) | |
| C08K 7/22 | (2006.01) | |
| C08K 5/05 | (2006.01) | |
| C09D 7/40 | (2018.01) | |
| C09D 7/20 | (2018.01) | |
| C08K 5/053 | (2006.01) | |

(52) U.S. Cl.
CPC ............ *C09D 125/10* (2013.01); *C09D 5/02* (2013.01); *C09D 5/028* (2013.01); *C09D 7/20* (2018.01); *C09D 7/70* (2018.01); *C08K 7/22* (2013.01)

(58) Field of Classification Search
USPC ............ 521/55; 524/923; 106/605; 523/201, 523/331
See application file for complete search history.

(56) References Cited

U.S. PATENT DOCUMENTS

| | | | |
|---|---|---|---|
| 4,972,000 A | 11/1990 | Kawashima et al. | |
| 5,106,881 A * | 4/1992 | Inoue ..................... | C09D 11/16 521/134 |
| 5,273,824 A | 12/1993 | Hoshino et al. | |
| 6,384,104 B1 | 5/2002 | Chang et al. | |
| 8,440,743 B2 * | 5/2013 | Oyanagi ................ | C09D 11/36 347/1 |
| 2003/0176535 A1 | 9/2003 | Chung et al. | |
| 2005/0203215 A1 | 9/2005 | Ugazio | |
| 2006/0046056 A1 | 3/2006 | Brown et al. | |
| 2007/0213438 A1 | 9/2007 | Mizutani et al. | |
| 2008/0022893 A1 | 1/2008 | Mizutani | |
| 2009/0162558 A1 | 6/2009 | Bardman et al. | |

FOREIGN PATENT DOCUMENTS

| | | |
|---|---|---|
| EP | 0022633 A2 | 1/1981 |
| JP | S62161874 A | 7/1987 |
| JP | 2005213366 A | 8/2005 |
| WO | 0100712 A1 | 1/2001 |

OTHER PUBLICATIONS

Machine translation of Description of JP 2005-213366 retrieved from ESPACENET (Year: 2005).*
Eckenrode, et al., "Reduced TiO2 Dependence in Both Water and Solventborne Architectural Coatings Using a Novel Opaque Polymer", The Waterborne Symposium (2012).
Garzon, "Benefits extended—Opaque polymer can be used in both solvent- and waterbased coatings", EP Coatings Journal, pp. 30-35 (2010).
Eckenrode, et al., "Shining New Light on Opaque Polymer", Coatingstech, pp. 40-45 (2012).

* cited by examiner

*Primary Examiner* — Fred M Teskin

(57) ABSTRACT

Provided is method of making a hollow polymer composition, comprising the steps of
(a) providing an aqueous dispersion comprising
  (i) hollow polymer particles, wherein the hollow polymer particles comprise polymerized units of one or more multivinyl monomer,
  (ii) water, and
  (iii) one or more organic alcohol, and
(b) removing water from the aqueous dispersion to form a dry composition comprising the hollow polymer particles and the alcohol, wherein either water is absent from the dry composition or else water is present in the dry composition in an amount such that the weight ratio of water to hollow polymer particles is 0.2:1 or less.
Also provided are dry compositions that could be made by such a method, and non-aqueous dispersions of such dry compositions.

2 Claims, No Drawings

HOLLOW POLYMER COMPOSITION

BACKGROUND

Hollow polymer particles are useful for a variety of purposes. For example, hollow polymer particles are used in pigmented coatings and inks, where they are believed to improve properties such as, for example, one or more of light scattering and gloss. Also, the use of hollow polymer particles can enable the reduction of the amount of mineral pigments such as titanium dioxide that is used in coatings and inks. Mineral pigments such as titanium dioxide are expensive, and reduction in the use thereof is desirable.

Some hollow polymer particles are manufactured in the form of an aqueous dispersion of the hollow polymer particles, for example by a process of aqueous emulsion polymerization. Various problems are encountered when adding such an aqueous dispersion into a coating or ink that has a carrier fluid that is an organic solvent that is not miscible with water. For example, H. M. Eckenrode and D. M. Fasano, in "Reduced TiO2 Dependence in Both Water and Solventborne Architectural Coatings Using a Novel Opaque Polymer," (Proceedings of the International Waterborne, High Solids, and Powder Coatings Symposium, 2012) describe the special steps that must be taken in order to evenly disperse hollow polymer particles in solventborne alkyd paints.

It would be desirable to provide a way to introduce hollow polymer particles into a solventborne coating or ink without the need for also introducing water into the solventborne coating or ink. In the course of making the present invention, it was found that an aqueous dispersion of hollow polymer particles could be dried, and the resulting dry product could be incorporated into a solventborne composition. However, it was also found that an aqueous dispersion of hollow polymer particles, if used directly in the form in which such a dispersion is normally manufactured, does not perform well in such a process. That is, it was found that if an aqueous dispersion of hollow polymer particles, as it is normally manufactured, was dried and then incorporated into a solventborne composition, the hollow polymer particles had a strong tendency to agglomerate in the solventborne composition, and such agglomeration is highly undesirable. It is desired to provide an aqueous composition that, when dried, forms a dry composition that incorporates into a solventborne composition without a strong tendency to agglomerate. It is also desired to provide such a dry composition, and a method of making such a dry composition. It is also desired to provide a solventborne composition that incorporates such a dry composition.

BRIEF SUMMARY

The following is a statement of the invention.

A first aspect of the present invention is an aqueous dispersion comprising
 (i) 40% to 98.9% water, by weight based on the weight of the aqueous dispersion,
 (ii) 1% to 40% hollow polymer particles, by weight based on the weight of the aqueous dispersion, wherein the hollow polymer particles comprise 0.01% to 20% polymerized units of one or more multivinyl monomer, by weight based on the weight of the hollow polymer particles, wherein the hollow polymer particles are dispersed in the water, and
 (iii) 0.1% to 20% one or more polyol, by weight based on the weight of the aqueous dispersion.

A second aspect of the present invention is a method of making a hollow polymer composition, comprising the steps of
 (a) providing an aqueous dispersion comprising
  (i) 1% to 40% hollow polymer particles, by weight based on the weight of the aqueous dispersion, wherein the hollow polymer particles comprise 0.01% to 20% polymerized units of one or more multivinyl monomer, by weight based on the weight of the hollow polymer particles.
  (ii) 40% to 98.9% water, by weight based on the weight of the aqueous dispersion, and
  (iii) 0.1% to 20% one or more organic alcohol, by weight based on the weight of the aqueous dispersion, and
 (b) removing water from the aqueous dispersion to form a dry composition comprising the hollow polymer particles and the alcohol, wherein either water is absent from the dry composition or else water is present in the dry composition in an amount such that the weight ratio of water to hollow polymer particles is 0.2:1 or less.

A third aspect of the present invention is a hollow polymer composition comprising hollow polymer particles and one or more organic alcohol, wherein the weight ratio of the organic alcohol to the hollow polymer particles is 0.01:1 to 1:1, wherein the hollow polymer particles comprise 0.01 to 20% polymerized units of one or more multivinyl monomer, by weight based on the weight of the hollow polymer particles, wherein water is optionally present in the hollow polymer composition in an amount such that the weight ratio of the water to the hollow polymer particles is 0:1 to 0.05:1.

A fourth aspect of the present invention is a non-aqueous dispersion comprising one or more organic alcohol and hollow polymer particles dispersed in a non-aqueous medium.

DETAILED DESCRIPTION

The following is a detailed description of the invention.

As used herein, the following terms have the designated definitions, unless the context clearly indicates otherwise.

A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Polymer molecular weights can be measured by standard methods such as, for example, size exclusion chromatography (SEC, also called gel permeation chromatography or GPC). Polymers have weight-average molecular weight (Mw) of 1000 or more. Polymers may have extremely high Mw; some polymers have Mw above 1,000,000; typical polymers have Mw of 1,000,000 or less. Some polymers are crosslinked, and crosslinked polymers are considered to have infinite Mw.

As used herein "weight of polymer" means the dry weight of polymer.

Molecules that can react with each other to form the repeat units of a polymer are known herein as "monomers." The repeat units so formed are known herein as "polymerized units" of the monomer.

Vinyl monomers have the structure I:

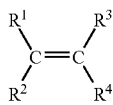

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof.

Vinyl monomers include, for example, vinyl aromatic monomers, dienes, ethylene, other alkenes, dienes, ethylene derivatives, and mixtures thereof. Ethylene derivatives include, for example, unsubstituted or substituted versions of the following: ethenyl esters of substituted or unsubstituted alkanoic acids (including, for example, vinyl acetate and vinyl neodecanoate), acrylonitrile, (meth)acrylic acids, (meth)acrylates, (meth)acrylamides, vinyl chloride, halogenated alkenes, and mixtures thereof. As used herein, "(meth)acrylic" means acrylic or methacrylic; "(meth)acrylate" means acrylate or methacrylate; and "(meth)acrylamide" means acrylamide or methacrylamide. "Substituted" means having at least one attached chemical group such as, for example, alkyl group, alkenyl group, vinyl group, hydroxyl group, carboxylic acid group, other functional groups, and combinations thereof. Substituted monomers include, for example, monomers with more than one carbon-carbon double bond, monomers with hydroxyl groups, monomers with other functional groups, and monomers with combinations of functional groups. (Meth)acrylates are substituted and unsubstituted esters or amides of (meth)acrylic acid.

As used herein, acrylic monomers are monomers selected from (meth)acrylic acid, aliphatic esters of (meth)acrylic acid, aliphatic esters of (meth)acrylic acid having one or more substituent on the aliphatic group, (meth)acrylamide, N-substituted (meth)acrylamides, and mixtures thereof.

As used herein, an "alkyl (meth)acrylate monomer" has the structure II

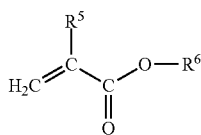

where $R^5$ is hydrogen or methyl, and $R^6$ is an unsubstituted alkyl group. As used herein, an "alkyl acrylate monomer" has structure II in which $R^5$ is hydrogen. As used herein, an "alkyl methacrylate monomer" has structure II in which $R^5$ is methyl.

As used herein, vinyl aromatic monomers are monomers that contain one or more vinyl group and one or more aromatic ring.

As used herein, a monovinyl monomer is a vinyl monomer that has exactly one polymerizable vinyl group. As used herein, a multivinyl monomer is a vinyl monomer that has two or more polymerizable vinyl groups.

As used herein, an ionic monomer is a monomer for which there is a range of pH values (the "ionic range") that lies fully or partially between pH 4 and pH 10 such that, when the monomer is in contact with water in the ionic range, 50 mole percent or more of the monomer molecules are in an ionic state. A nonionic monomer is a monomer that is not an ionic monomer.

The glass transition temperature of a polymer is measured by differential scanning calorimetry at 10° C./minute, using the midpoint method.

Particles are characterized by their diameter. If a particle is not spherical, its diameter is taken herein to the diameter of a sphere of volume equal to the volume of the particle.

A polymer is considered herein to be "swollen" when in contact with a swelling liquid if the polymer in the initial state has volume V0, and the polymer when in contact with and in equilibrium with the swelling liquid has volume V1, and the quotient V1/V0 has the value 1.2 or greater. The "initial state" of the polymer is a state in which the polymer is not in contact with the swelling liquid, though the polymer in the initial state may or may not be in contact with some other liquid. In the initial state, the polymer is in contact with and in equilibrium with its surroundings, and those surroundings do not include any liquid capable of being a swelling liquid.

As used herein, a hollow polymer particle is a particle that contains a core polymer and shell polymer that partially or fully encapsulates the core polymer. The core polymer is water-swellable, which means that there exists a range of pH values (the "swelling range") that falls between pH=4 and pH=10 such that, when the core polymer is in contact with water at a pH value inside the swelling range, then the water swells the core polymer. The shell polymer is not water-swellable, which means there is no pH value between 4 and 10 at which water will swell the shell polymer. Particles that meet this definition are considered hollow polymer particles, even under conditions in which the core polymer is swollen.

It is contemplated that, when the hollow polymer particle is in contact with water having pH in the swelling range, then the swollen core polymer fills the volume defined by the inner surface of the shell polymer. It is further contemplated that, when the hollow polymer particle is in contact with air under conditions that allow water within the hollow polymer particle to evaporate, then the water will evaporate and the core polymer will shrink, leaving a volume of air inside the inner surface of the shell polymer. The volume of air inside the inner surface of the shell polymer is known herein as the "void."

The hollow polymer particle is characterized by the void fraction. The void fraction is assessed on the dried hollow polymer particle. The void fraction is defined as follows:

(void fraction)=(volume of the void)/(volume of the hollow polymer particle)

As used herein, the weight of hollow polymer particles refers to the dry weight of the hollow polymer particles.

A dispersion is a composition in which particles are distributed throughout a liquid medium. When describing the particles in a dispersion, the term "distributed" herein is considered synonymous with the term "dispersed." The distributed particles have volume-average diameter of 10 nm or greater, and the distributed particles are not dissolved in the liquid medium. If the liquid medium contains 50% or more water by weight based on the weight of the liquid medium, the medium is said herein to be an aqueous medium. A dispersion in an aqueous medium is an aqueous dispersion. In an aqueous dispersion, the distributed particles are said herein to be dispersed in water, even when the aqueous medium is not pure water.

In a dispersion, if the liquid medium contains less than 50% water by weight based on the weight of the liquid medium, the medium is said herein to be a non-aqueous medium. A dispersion in a non-aqueous medium is a non-aqueous dispersion.

A solvent is a compound other than water that is liquid at a range of temperatures that includes 15° C. to 30° C. and that has a boiling point of 120° C. or lower. A solventborne composition is a composition that contains 25% or more of one or more solvents and that contains 10% or less water, by weight based on the weight of the composition.

A composition is considered herein to be "dry" if the composition contains 0% to 5% water by weight, based on the weight of the composition, and contains 0% to 5% solvent by weight, based on the weight of the composition.

A polymer is considered herein to be a film-forming polymer if the polymer, when dry at 20° C., forms a solid mass rather than separate particles such as powder particles or flakes. For example, any polymer that is suitable as a binder polymer for a coating or ink that is suitable to applied and dried at 25° C. is considered herein to a film-forming polymer. For example, a polymer in the form of polymer particles dispersed in a liquid medium, if the polymer particles contain one or more polymer having glass transition temperature of 25° C. or lower, is considered herein to be a film-forming polymer, unless the particles are enclosed by a shell polymer having glass transition temperature of 30° C. or higher. A polymer that is blended with a plasticizer or coalescent is considered to be a film-forming polymer if the blend of polymer with plasticizer or coalescent forms a film at 25° C.

When a ratio is said herein to be X:1 or greater, it is meant that the ratio is Y:1, where Y is greater than or equal to X. For example, if a ratio is said to be 3:1 or greater, that ratio may be 3:1 or 5:1 or 100:1 but may not be 2:1. Similarly, when a ratio is said herein to be W:1 or less, it is meant that the ratio is Z:1, where Z is less than or equal to W. For example, if a ratio is said to be 15:1 or less, that ratio may be 15:1 or 10:1 or 0.1:1 but may not be 20:1.

An organic alcohol is a compound having structure III

$$R^7\text{—OH} \qquad \qquad \text{III}$$

where $R^7$ is an organic group that contains one or more carbon atom. The oxygen atom shown in structure III is bonded to a carbon atom in group $R^7$. A polyol is an organic alcohol in which $R^7$ contains at least one —OH group (in addition to the —OH group shown in structure III) that is bonded to a carbon atom in group $R^7$. In a polyol, more than one —OH group may be bonded to a single carbon atom in group $R^7$, or every —OH group that is bonded to a carbon atom may be bonded to a different carbon atom, or a combination thereof.

The present invention involves hollow polymer particles. Hollow polymer particles contain a core polymer and a shell polymer. Other polymers may also be present in a hollow polymer particle in addition to the core polymer and the shell polymer. For example, the core polymer may optionally contain a seed polymer. For another example, an intermediate polymer may be present between the core polymer and the shell polymer. For another example, an external polymer may partially or fully encapsulate the shell polymer.

The core polymer swells when in contact with water at some range of pH values (the swelling range, as defined above). Preferably, the core polymer contains polymerized units of one or more hydrophilic monomers. Preferred hydrophilic monomers are vinyl monomers bearing a carboxyl group or an amine group; preferably a carboxyl group. Preferred hydrophilic monomers are acrylic acid, methacrylic acid, acryloxypropionic acid, (meth)acryloxypropi-onic acid, itaconic acid, aconitic acid, maleic acid or anhydride, fumaric acid, crotonic acid, monomethyl maleate, monomethyl fumarate, monomethyl itaconate, and mixtures thereof; more preferred are acrylic acid, methacrylic acid, and mixtures thereof.

Preferably the amount of polymerized units of hydrophilic monomer in the core polymer is, by weight based on the weight of core polymer, 100% or less; more preferably 60% or less; more preferably 50% or less. Preferably the amount of polymerized units of hydrophilic monomer in the core polymer is, by weight based on the weight of core polymer, 5% or more; more preferably 20% or more; more preferably 30% or more.

The core polymer optionally contains polymerized units of one or more nonionic monomer. Preferred nonionic monomers for core polymer are nonionic vinyl aromatic monomers, nonionic alkyl (meth)acrylate monomers, (meth)acrylonitrile, (meth)acrylamide, and mixtures thereof; more preferred are nonionic vinyl aromatic monomers, nonionic alkyl (meth)acrylate monomers, and mixtures thereof.

The shell polymer preferably contains polymerized units of one or more nonionic monomers. The preferred nonionic monomers for use in the shell polymer are the same as those described above for use in the core polymer. For use in the shell polymer, vinyl aromatic monomers are preferred; more preferred is styrene. Preferably the amount of polymerized units of nonionic monomer in the shell polymer is, by weight based on the weight of the shell polymer, 80% to 100%; more preferably 90% to 100%.

The hollow polymer particles may be formed by any method. A preferred method is aqueous emulsion polymerization. Preferably, the core polymer is made by aqueous emulsion polymerization to produce a latex of core polymer particles suspended in water. Preferably, the shell polymer is then made by aqueous emulsion polymerization in the presence of the latex of core polymer particles, to produce a latex of polymer particles suspended in water, where 50% to 100% (by number) of the individual particles each contains a shell polymer that partially or fully encapsulates the core polymer. Preferably, prior to completion of the polymerization of the shell polymer, the pH is adjusted to be in the swelling range of the core polymer, so that some or all of the polymerization of the shell polymer is conducted while the core polymer is swollen.

Optionally, additional polymerization processes may be conducted. For example, an emulsion polymerization process may be conducted to produce a latex of seed particles, and the core polymer may be formed by an emulsion polymerization process conducted in the presence of the latex of seed particles. For another example, an intermediate polymer may be made by an emulsion polymerization process conducted in the presence of a latex of core polymer particles to produce a latex (an "intermediate latex") in which 50% to 100% (by number) of the individual particles each contains a core polymer and an intermediate polymer, and then the shell polymer may be made by an emulsion polymerization in the presence of the intermediate latex.

Preferably the shell polymer fully encapsulates the core polymer. In embodiments in which the core polymer contains polymerized units of monomers that have carboxyl groups, full encapsulation may be observed by studying an aqueous suspension of hollow polymer particles and performing a titration with an alkaline aqueous solution an alkali metal hydroxide under normal analytical conditions of 1 hour at 23° C. When the shell fully encapsulates the core, no titration end point occurs.

Preferably the shell polymer contains polymerized units of one or more nonionic monovinyl monomer. Preferred nonionic monomers for shell polymer are nonionic monovinyl vinyl aromatic monomers, nonionic monovinyl alkyl (meth)acrylate monomers, (meth)acrylonitrile, (meth)acrylamide, and mixtures thereof; more preferred are nonionic monovinyl vinyl aromatic monomers, nonionic monovinyl alkyl (meth)acrylate monomers, and mixtures thereof. More-preferred nonionic monovinyl monomers for shell polymer are nonionic monovinyl vinyl aromatic monomers, nonionic monovinyl (meth)acrylate monomers, and mixtures thereof. Preferred are nonionic monovinyl vinyl aromatic monomers. Among nonionic monovinyl vinyl aromatic monomers, preferred is styrene. Among nonionic monovinyl (meth)acrylate monomers, preferred are nonionic unsubstituted alkyl esters of (meth)acrylic acid; more preferably nonionic unsubstituted alkyl esters of (meth) acrylic acid in which the ester group has 1 to 4 carbon atoms.

Preferably, in the shell polymer, polymerized units of nonionic monovinyl monomer are present, by weight based on the weight of the shell polymer, in an amount of 50% to 100%; more preferably 75% to 100%.

Preferably, the shell polymer has glass transition temperature of 30° C. or higher; more preferably 50° C. or higher; more preferably 70° C. or higher; more preferably 90° C. or higher.

The hollow polymer particles preferably comprise polymerized units of one or more multivinyl monomer. Preferred multivinyl monomers are multivinyl aromatic monomers, alpha,beta-ethylenically unsaturated monocarboxylic acid esters of polyhydric alcohols containing 2-6 ester groups, other multivinyl monomers, and mixtures thereof. Preferred are multivinyl aromatic monomers. Among multivinyl aromatic monomers, preferred are divinyl benzene, trivinyl benzene, diallyl phthalate, and mixtures thereof; more preferred is divinyl benzene. Among alpha,beta-ethylenically unsaturated monocarboxylic acid esters of polyhydric alcohols containing 2-6 ester groups, preferred are ethylene glycol diacrylate; ethylene glycol dimethacrylate; 1,3-butylene glycol diacrylate; 1,4-butylene glycol diacrylate; propylene glycol diacrylate; triethylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; and mixtures thereof. Among other multivinyl aromatic monomers, preferred are methylene bis-acrylamide; methylene bis-methacrylamide; vinyl methacrylate; vinyl crotonate; vinyl acrylate; vinyl acetylene; triallyl cyanurate; divinyl acetylene; divinyl ethane; divinyl sulfide; divinyl ether; divinyl sulfone; diallyl cyanamide; ethylene glycol divinyl ether; divinyl dimethyl silane; glycerol trivinyl ether; divinyl adipate; dicyclopentenyl (meth) acrylates; dicyclopentenyloxy (meth)acrylates; unsaturated esters of glycol monodicyclopentenyl ethers; allyl methacrylate; allyl acrylate; diallyl maleate; diallyl fumarate; diallyl itaconate; and mixtures thereof.

Preferably, the amount of polymerized units of multivinyl monomers in the hollow polymer particles is, by weight based on the weight of the hollow polymer particles, 0.1% or more; more preferably 1% or more; more preferably 5% or more; more preferably 10% or more. Preferably, the amount of polymerized units of multivinyl monomers in the hollow polymer particles is, by weight based on the weight of the hollow polymer particles, 30% or less; more preferably 25% or less; more preferably 20% or less. Polymerized units of multivinyl monomers may be located in the core polymer, in the shell polymer, in other polymers contained in the hollow polymer particle, or any combination thereof. Preferably the shell polymer contains polymerized units of multivinyl monomers.

Preferably, the hollow polymer particle has void fraction of 5% or more; more preferably 10% or more; more preferably 15% or more; more preferably 20% or more. Preferably, the hollow polymer particle has void fraction of 60% or less; more preferably 50% or less; more preferably 40% or less.

Preferably, the volume-average diameter of the hollow polymer particles is 70 nm or more; more preferably 100 nm or more; more preferably 200 nm or more. Preferably, the volume-average diameter of the individual hollow polymer particles is 4.5 µm or less; more preferably 3 µm or less; more preferably 1 µm or less.

In the hollow polymer particles, preferably the weight ratio of shell polymer to core polymer is 5:1 or higher; more preferably 8:1 or higher. In the hollow polymer particles, preferably the weight ratio of shell polymer to core polymer is 20:1 or lower; more preferably 15:1 or lower.

The composition of the present invention contains one or more organic alcohol. As defined above, an organic alcohol has the structure $R^7$—OH. Preferred organic alcohols have no atoms other than carbon, hydrogen, and oxygen. Preferably every oxygen atom in the organic alcohol is part of an OH group. Preferred organic alcohols have molecular weight of 300 or less; more preferably 200 or less; more preferably 150 or less; more preferably 100 or less. Preferably, the organic alcohol is a polyol. Preferably, the total number of OH groups on the organic alcohol is 2 or more; more preferably 3 or more. Preferably, the total number of OH groups on the organic alcohol is 6 or fewer; more preferably 5 or fewer; more preferably 4 or fewer.

Preferred organic alcohols are not solvents. Preferred organic alcohols have boiling point of greater than 120° C.; more preferably 150° C. or greater; more preferably 175° C. or greater.

Some suitable organic alcohols include alpha-cyclodextrin, beta-cyclodextrin, gamma-cyclodextrin, sorbitol; xylitol; erythritol; glycerol; propane-1,2-diol; propane-1,3-diol; butane-1,2-diol; butane-1,3-diol; butane-1,4-diol; butane-2,3-diol; ethylene glycol; propylene glycol; diethylene glycol; dipropylene glycol; butan-1-ol; and mixtures thereof. Preferred are alpha-cyclodextrin glycerol, and mixtures thereof; more preferred is glycerol.

Preferably, the weight ratio of the organic alcohol to the hollow polymer particles is 0.02:1 or greater; more preferably 0.03:1 or greater; more preferably 0.05:1 or greater; more preferably 0.08:1 or greater; more preferably 0.1:1 or greater. Preferably, the weight ratio of the organic alcohol to the hollow polymer particles is 0.8:1 or less; more preferably 0.6:1 or less; more preferably 0.4:1 or less.

Preferably, the amount of hollow polymer particles in the aqueous dispersion of the present invention, by weight based on the weight of the aqueous dispersion, is 2% or more; more preferably 5% or more; more preferably 10% or more; more preferably 20% or more. Preferably, the amount of hollow polymer particles in the aqueous dispersion of the present invention, by weight based on the weight of the aqueous dispersion, is 55% or less; more preferably 50% or less; more preferably 45% or less; more preferably 40% or less; more preferably 35% or less.

Preferably, the amount of water in the aqueous dispersion of the present invention is, by weight based on the weight of the aqueous dispersion, 50% or more; more preferably 60% or more; more preferably 65% or more. Preferably, the amount of water in the aqueous dispersion of the present invention is, by weight based on the weight of the aqueous dispersion, 90% or less; more preferably 80% or less; more preferably 75% or less.

Preferably, the amount of organic alcohol in the aqueous dispersion is, by weight based on the weight of the aqueous dispersion, 0.2% or more; more preferably 0.5% or more. Preferably, the amount of organic alcohol in the aqueous dispersion is, by weight based on the weight of the aqueous dispersion, 16% or less; more preferably 12% or less; more preferably 8% or less.

The diameter of the hollow polymer particles is preferably characterized by dynamic light scattering, under conditions in which the core is not swollen. The volume-average diameter is preferably 70 nm or more; more preferably 100 nm or more; more preferably 200 nm or more. The volume-average diameter is 4.5 µm or less; more preferably 3 µm or less; more preferably 1 µm or less.

Preferably, the aqueous dispersion of the present invention has the form of hollow polymer particles dispersed in an aqueous medium. Preferably, the amount of water in the aqueous medium is, by weight based on the weight of the aqueous medium, 60% or more; more preferably 70% or more; more preferably 80% or more. It is contemplated that the organic alcohol may be incorporated in the hollow polymer particles or dissolved in the aqueous medium or resident at the interface between the hollow polymer particles and the aqueous medium or any combination thereof.

Preferably, the aqueous dispersion of the present invention either contains no film-forming polymer or else, if film-forming polymer is present, the weight ratio of film-forming polymer to hollow polymer particles is 0.01:1 or lower.

A preferred use of the aqueous dispersion of the present invention is to remove water from the aqueous dispersion to produce a dry composition.

Removal of water may be performed by any method. A preferred method is spray drying. In spray drying, the aqueous dispersion passes through an atomizer or spray nozzle to form droplets. Each droplet contains water and a plurality of hollow polymer particles. Droplets have volume-average diameter of 50 µm to 500 µm. The droplets encounter gas, usually air at a temperature above 25° C. The droplets lose water by evaporation and become powder particles. Spray drying may be followed by further drying, for example by drying in a fluidized bed.

Other drying processes may be used. For example, the aqueous dispersion may be coagulated, filtered, and dried using a belt drier and/or a fluidized bed dryer. For other examples, the aqueous dispersion may be dried by freeze drying or drum drying. If the drying process does not produce a powder, the product may be subjected to further mechanical processes, such as agitation and/or grinding, to produce a powder.

It is contemplated that in a dry composition of the present invention, the hollow polymer composition is present in the form of powder particles. Preferably, the volume-average diameter of the powder particles is 10 µm to 2 mm Each powder particle contains a plurality of individual hollow polymer particles.

In a dry composition of the present invention, the hollow polymer composition contains a relatively small amount of water. Preferably, the weight ratio of the water to the hollow polymer particles is from 0:1 to 0.05:1; more preferably from 0:1 to 0.02:1; more preferably from 0:1 to 0.01:1.

The dry composition optionally contains a flow aid. A flow aid is a plurality of solid particles of volume average diameter of 100 nm to 50 µm. Flow aids are either mineral compounds or are organic polymers of glass transition temperature of 80° C. or higher. Among mineral compounds, preferred are oxides, for example silica.

Preferably, the dry composition of the present invention either contains no film-forming polymer or else, if film-forming polymer is present, the weight ratio of film-forming polymer to hollow polymer particles is 0.01:1 or lower.

A preferred use of the dry composition of the present invention is as an ingredient in a solventborne composition. Preferred solventborne compositions have 50% or more solvent, by weight based on the weight of the composition. In preferred solventborne compositions, ingredients other than solvent are either dissolved in solvent or form a dispersion in solvent. Preferably, in the solventborne composition, the hollow polymer particles are dispersed in a non-aqueous medium.

Preferably, the volume-average diameter of the hollow polymer particles in the non-aqueous dispersion is 70 nm or more; more preferably 100 nm or more; more preferably 200 nm or more. Preferably, the volume-average diameter of the hollow polymer particles in the non-aqueous dispersion is 4.5 µm or less; more preferably 3 µm or less; more preferably 1 µm or less.

In the non-aqueous dispersion, the liquid medium preferably contains one or more solvent. Preferably, the amount of solvent is, by weight based on the weight of liquid medium, 60% or more; more preferably 75% or more; more preferably 85% or more.

Preferred solvents have boiling point of 100° C. or less; more preferably 90° C. or less. Preferred solvents are hydrocarbon solvents and solvents in which the molecule contains only atoms of carbon, hydrogen and oxygen; more preferred are solvents in which the molecule contains only atoms of carbon, hydrogen and oxygen; more preferred are ethanol, isopropanol; and ethyl acetate.

Some useful non-aqueous dispersions are useful as coatings. Coatings may be continuous, such as paints, or discontinuous, such as inks. Preferred coatings contain one or more polymer binder. Polymer binders are capable of film formation after the non-aqueous dispersion is applied to a substrate. During or after the removal of solvent, or both, the polymer binder undergoes film formation. The layer of the non-aqueous dispersion on the surface of the substrate is optionally brought into contact with air at a temperature above 40° C. Some polymer binders undergo a crosslinking reaction during or after the removal of solvent, and some polymer binders do not.

Coatings optionally contain one or more of the following: one or more mineral pigments; one or more colorants; one or more rheology modifiers; and mixtures thereof.

EXAMPLES

The following are examples of the present invention.

Example numbers ending in "C" are comparative examples. The following abbreviations are used:

Dv50=a characteristic of a collection of particles. Dv50 is a diameter chosen so that exactly 50% of the particles in the collection of particles, by volume, have diameter less than Dv50.

Dv90=a characteristic of a collection of particles, independent of Dv50. Dv90 is a diameter chosen so that exactly 90% of the particles in the collection of particles, by volume, have diameter less than Dv90.

DVB=divinyl benzene

MMA=methyl methacrylate

HP-1=aqueous dispersion of hollow polymer particles, produced by aqueous emulsion polymerization. Volume-average particle diameter=0.4 μm. Polymer content 26% by weight based on the weight of HP-1. Void fraction=30%. Overall composition of polymerized units, in parts by weight: 15 parts DVB/60 parts Styrene/25 parts MMA. In the aqueous dispersion, Dv50 is 0.48 μm.

HP-2C=polymer latex of hollow polymer particles, made with no multivinyl monomer; polymer content 30% by weight based on the weight of HP-2C.

Binder-1=Lucidene™ 606 APEF emulsion, a soft styrene-acrylic polymer latex, supplied by The Dow Chemical Company, supplied as 47% polymer solids by weight based on the weight of Binder-1.

PCC=precipitated calcium carbonate
GCC=ground calcium carbonate
HPMC=Methocel™ VLV hydroxypropyl methylcellulose, from the Dow Chemical Company
PVOH=Rhodoviol™ 4/20 polyvinyl alcohol, from Solvay
a-CD=alpha-cyclodextrin

Example 1: Solvent Resistance of Coatings

To test the ability of hollow polymer particles to perform in the presence of solvent, the following test was performed. A water-borne coating containing a hollow polymer particle was made and then applied to a substrate and dried. Then solvent was applied to the surface of the dried coating. If the coating became transparent when the solvent was applied, it was considered that the solvent caused the hollow polymer particle to collapse, thereby ruining the formerly-hollow polymer particle's ability to scatter light. That hollow polymer particle was deemed unsuitable for use with solvent. In contrast, if a dried water-borne coating containing a different hollow polymer particle remained opaque after exposure to solvent, that hollow polymer particle was deemed suitable for use with solvent.

The water-borne coatings used for this test and the results were as follows. The amounts of the ingredients are parts by weight of the latexes as supplied. The viscosity of each coating was adjusted by addition of alkali swellable emulsion to achieve viscosity of 30 to 35 seconds at 23° C. in a DIN #4 cup.

|  | Example 1-1C | Example 1-2 |
| --- | --- | --- |
| HP-1 |  | 85 |
| HP-2C | 85 |  |
| Binder-1 | 15 | 15 |
| isopropanol | opaque | opaque |
| ethyl acetate | transparent | opaque |

The coating that employs HP-2C turns transparent on exposure to ethyl acetate. Therefore HP-2C, which contains no polymerized units of multivinyl monomer, is not suitable as the hollow polymer particles of the present invention.

Example 2: Drying and Re-Dispersing

Samples of HP-1 were dried in a laboratory drier, which makes a thin layer of aqueous latex HP-1 on a substrate and then exposes the layer to heated air at 110° C. When the layer is dry, it is lightly ground with glass beads to produce powder. The powder was then mixed with ethanol and subjected to a grinding process. Grinding was conducted in a Mastersizer particle size analyzer from Malvern Instruments Limited, which has a propeller to agitate the liquid sample and apparatus to circulate some of the liquid sample through a laser light scattering device to measure the particle size distribution. Sufficient powder was added to ethanol to give 13% obscuration of the measuring laser beam at the beginning of the test, as suggested by the instrument software. The mixture thus formed was then agitated in the instrument for 20 minutes, as the instrument continued to measure the particle size distribution by laser light scattering. Typically, in samples that dispersed well in the ethanol, the obscuration at 20 minutes was greater than the 13% obscuration at the beginning of the test.

Dv50 is measured after 20 minutes of the grinding process. It is considered that large values of Dv50 shows that the powder remains agglomerated in the ethanol; that is, large Dv50 shows that the powder fails to separate into the original hollow polymer particles. Perfect re-dispersion of the hollow polymer particles would yield a Dv50 of 0.48 μm. After 20 minutes of grinding, Dv50 of 5 μm or lower is considered desirable. It is also desirable that the additive cause a low value of Dv50 when the additive is used in an amount such that the weight ratio of the additive to hollow polymer particles is 0.3:1 or less.

Further, it is desirable that Dv90 is low after 20 minutes of the grinding process. One possible outcome of the grinding process is a dispersion in which many particles of small diameter are present, but a few extremely large agglomerates are also present. This is an undesirable outcome, because even a small number of large agglomerates can ruin the appearance of a coating. The presence of the many small-diameter particles can cause a relatively low value of Dv50, but the presence of the large agglomerates will cause Dv90 to be relatively high.

Various compounds were added to HP-1 prior to drying. The additives and the results after drying and grinding in ethanol are shown below. Examples with suffix "C" are comparative examples.

| Example | Additive | Amount of additive[1] | Dv50 after 20 min (μm) | Dv90 after 20 min (μm) |
| --- | --- | --- | --- | --- |
| 1C[2] | none | 0 | 33.0 | 63.2 |
| 2C | none | 0 | 1.8 | 28.6 |
| 3C | none | 0 | 5.0 | 49.8 |
| 4C | PCC | 45 | 12.0 | 65.2 |
| 5C | GCC | 43 | 26.0 | 158.2 |
| 6C | TiO2 | 43 | 7.6 | 66.8 |
| 7C | BaSulf | 43 | 2.7 | 24.5 |
| 8C | BaSulf | 50 | 3.8 | 44.9 |
| 9C | Kaolin | 20 | 3.7 | 15.1 |
| 10 | HPMC | 1.5 | 25.7 | 195.0 |
| 11 | D-fructose | 1 | 70.9 | 198.2 |
| 12 | D-fructose | 5 | 15.6 | 122.5 |
| 13 | D-fructose | 10 | 39.5 | 158.8 |
| 14 | D-glucose | 1 | 52.5 | 176.7 |
| 15 | D-glucose | 5 | 88.6 | 208.6 |
| 16 | D-glucose | 10 | 30.2 | 204.3 |
| 17 | PVOH | 5 | 6.8 | 23.2 |
| 18 | PVOH | 10 | 4.5 | 33.6 |
| 19 | PVOH | 20 | 6.4 | 74.9 |
| 20 | a-CD | 0.1 | 3.9 | 18.4 |
| 21 | a-CD | 1 | 7.6 | 46.1 |
| 22 | a-CD | 3 | 1.0 | 4.3 |
| 23 | a-CD | 10 | 5.0 | 48.5 |
| 24 | glycerol[3] | 1 | 3.6 | 14.0 |
| 25 | glycerol[3] | 5 | 2.5 | 15.7 |
| 26 | glycerol[3] | 8 | 0.9 | 2.8 |

Note:
[1] weight of additive as supplied divided by the total weight of HP-1, expressed as a percentage.

Note:
[2] spray dried in a laboratory-scale spray drier. All others were dried in a lab drier as described above.

Note:
[3] glycerol was supplied as a solution of glycerol (85% by weight) in water (15% by weight).

Glycerol performed the best: with only 1% to 8% use level, glycerol achieved low values of Dv50 and Dv90 in the samples after 20 minutes of grinding in ethanol. Also performing well was alpha-cyclodextrin, which performed almost as well at 10% use level and below. PVOH also performed well, though the use level of PVOH was somewhat higher. Glycerol, alpha-cyclodextrin, and PVOH are all polyols. Other polyols tested, D-fructose, D-glucose, and HPMC, showed some beneficial effect on particle size but not as good an effect as shown by the polyols glycerol and alpha-cyclodextrin.

Comparative additives PCC, GCC, TiO2, barium sulfate, and kaolin, showed some beneficial effect on particle size but at very high use levels. The comparative samples with no additive showed unacceptably high values of Dv90.

The invention claimed is:

1. A method of making a hollow polymer composition, comprising the steps of
   (a) providing an aqueous dispersion comprising
      (i) 1% to 40% hollow polymer particles, by weight based on the weight of the aqueous dispersion, wherein the hollow polymer particles comprise 0.01% to 20% polymerized units of one or more multivinyl monomer, by weight based on the weight of the hollow polymer particles,
      (ii) 40% to 98.9% water, by weight based on the weight of the aqueous dispersion, and
      (iii) 0.1% to 20% one or more organic alcohol, by weight based on the weight of the aqueous dispersion, and
   (b) removing water from the aqueous dispersion to form a dry composition comprising the hollow polymer particles and the alcohol, wherein either water is absent from the dry composition or else water is present in the dry composition in an amount such that the weight ratio of water to hollow polymer particles is 0.2:1 or less.
2. The method of claim 1, further comprising the step
   (c) after step (b), forming a dispersion of the dry composition in a non-aqueous medium.

* * * * *